United States Patent
Grauer

(10) Patent No.: US 8,162,591 B2
(45) Date of Patent: Apr. 24, 2012

(54) MULTISTAGE COMPRESSOR FOR A GAS TURBINE, COMPRISING DISCHARGE PORTS AND INJECTION PORTS TO STABILIZE THE COMPRESSOR FLOW

(75) Inventor: Frank Grauer, Karlsfeld (DE)

(73) Assignee: MTU Aero Engines GmbH, Munich (DE)

( * ) Notice: Subject to any disclaimer, the term of this patent is extended or adjusted under 35 U.S.C. 154(b) by 938 days.

(21) Appl. No.: 12/092,221

(22) PCT Filed: Oct. 26, 2006

(86) PCT No.: PCT/DE2006/001889
§ 371 (c)(1),
(2), (4) Date: Jul. 29, 2008

(87) PCT Pub. No.: WO2007/051444
PCT Pub. Date: May 10, 2007

(65) Prior Publication Data
US 2009/0232636 A1    Sep. 17, 2009

(30) Foreign Application Priority Data
Nov. 3, 2005    (DE) .......................... 10 2005 052 466

(51) Int. Cl.
*F01D 25/24* (2006.01)

(52) U.S. Cl. ........................ 415/58.4; 415/58.5; 415/108
(58) Field of Classification Search .................. 415/58.4, 415/58.5, 108
See application file for complete search history.

(56) References Cited

U.S. PATENT DOCUMENTS

| | | | |
|---|---|---|---|
| 2,875,957 A | 3/1959 | Wendshuh | |
| 2,933,238 A | 4/1960 | Stalker | |
| 2,944,729 A | 7/1960 | Foley et al. | |
| 4,930,978 A * | 6/1990 | Khanna et al. | 415/58.3 |
| 5,403,149 A * | 4/1995 | Arnet et al. | 415/58.6 |
| 5,607,284 A | 3/1997 | Byrne et al. | |
| 6,125,626 A | 10/2000 | El-Aini et al. | |
| 6,183,192 B1 * | 2/2001 | Tressler et al. | 415/115 |
| 7,721,542 B2 * | 5/2010 | Chen | 60/605.2 |
| 2004/0081552 A1 | 4/2004 | Guemmer | |

* cited by examiner

*Primary Examiner* — Jarrett Stark
*Assistant Examiner* — Nicholas Tobergte
(74) *Attorney, Agent, or Firm* — Greer, Burns & Crain, Ltd.

(57) ABSTRACT

A multistage compressor for a gas turbine, having a compressor housing, guide vanes, impeller vanes, a hub area, discharge ports, and injection ports for stabilizing the compressor flow, wherein the discharge ports are situated at least one stage downstream from the injection ports, the injection ports being fashioned as nozzles, and the geometry of these nozzles is designed such that the flow speed of the injected air stream is significantly greater than the speed of the flow in a critical cross-section.

8 Claims, 2 Drawing Sheets

MULTISTAGE COMPRESSOR FOR A GAS TURBINE, COMPRISING DISCHARGE PORTS AND INJECTION PORTS TO STABILIZE THE COMPRESSOR FLOW

The present invention relates to a multistage compressor for a gas turbine, having a compressor housing, guide vanes, impeller vanes, a hub area, discharge ports and injection ports in order to stabilize the compressor.

In gas turbines, the compressor is designed for particular flight states. For these design points, the compressor must achieve the pre-calculated characteristic values such as throughput pressure ratio, efficiency, etc. In addition, however, the compressor must also have acceptable and safe operating characteristics within a broad range of rotational speeds beyond the design points. This part load behavior, or also transient behavior, in which the full propulsion power is not demanded, is particularly important in aircraft engines, e.g. during the landing approach of an airplane, where for example rapid changes in thrust, and thus rapid changes in rotational speed, are required in order to maintain the aircraft's glideslope. However, when the engine is being started up, i.e. in the lower rotational speed range, the compressor must provide problem-free flow and enable the engine to be rapidly run up to full load.

In order to determine the part load behavior, a compressor characteristic field is measured with which the reliable operating range around the design point is determined along what is called a trajectory. The trajectory connects operating points on different rotational speed lines, and has a sufficient safety distance from what is called the pump limit. The stall at the compressor vanes is called pumping, or surge.

In the characteristic field of a compressor, operating regions can be identified that are critical under certain circumstances with respect to the existing pump limit distance, e.g. transient maneuvers of an aircraft driven by the gas turbine. These briefly existing operational states are decisive for the determination of the pump limit distance that is to be maintained in the design.

In principle, it is known that the injection of air into the housing area of a compressor can under certain conditions shift the pump limit to lower throughputs. In the literature, various interventions are known for stabilizing compressors, including for example the discharge of compressor air through discharge valves, known as bleed valves, injection of air via recirculation, adjustment of variable guide vanes in the compressor, or modulation of the fuel supply. In most cases, the intervention is initiated by an advance notification, not described in more detail, of a possible instability. In most published references, for this purpose pressure measurements are provided at various points in a compressor as input quantities for a regulating system.

U.S. Pat. No. 5,607,284 discloses a compressor housing having recirculation ducts. In the vane tip covering of an impeller vane stage, there is situated an annular segment that has discharge ports on the side of the vane situated downstream and injection ports on the side of the vane situated upstream. The discharge and injection ports are connected by ducts that are interrupted by flow guide elements. In this way, a continuous unregulated backflow is produced that is intended to prevent stall and the pumping connected therewith. An example of a corresponding arrangement is shown schematically in FIG. 3.

FIG. 3 shows a system of a compressor 1 known from the prior art. Discharge port 5 and injection port 4 are situated on the same stage, i.e., here over the same impeller vane 6. Valves or nozzles are not present here. There is also no regulation of the injected air or of the injection process. Rather, a permanent recirculation of the air is produced via a stage, connected with the corresponding losses.

On the one hand, in this system it is disadvantageous that the continuous backflow also means that losses of efficiency have to be accepted, even though there is no danger of pumping. Moreover, the recirculation of the flow to the same stage often does not supply enough energy-rich flow, so that under particularly critical operating conditions this solution alone is not sufficient to prevent pumping.

The object of the present invention is therefore to avoid the above-named technical problems in the prior art, and to provide an improved solution that achieves significant improvements with respect to efficiency and reduced engine weight.

According to the present invention, this object is achieved by the features of patent claim 1. Advantageous specific embodiments and developments of the present invention are indicated in the subclaims.

The present invention solves the problems of the prior art and enables significantly improved efficiency and reduced engine weight.

According to the present invention, a multistage compressor for a gas turbine is provided having a compressor housing, guide vanes, impeller vanes, a hub area, discharge ports, and injection ports for stabilizing the compressor flow, characterized in that the discharge ports are situated at least one stage downstream from the injection ports.

This makes it possible to achieves significant improvements with regard to efficiency and engine weight, because the compressor can be designed with a pump limit distance that a small enough that it can be stably operated in stationary operation, and the pump limit distance can be ensured through a regulating intervention that is brief in critical operating conditions.

The majority of critical operating states occur in the transient area, when the compressor is operated in part load operation. In this operating range, normally the front stages determine the stability, because here the flow is first separated and the compressor begins to pump. The solution to the present invention provides that during an operating state recognized as critical, air with sufficiently high pressure is tapped from one of the rear compressor stages, and is reinjected before or via the stage causing the instability with a high excess speed in the critical cross-section of the front stages. The pressure difference between the tap point and the injection point must be selected such that the required excess speed can be achieved, which is ensured by a corresponding stage distance between the discharge point and the injection point. The air can be guided to the front stages via pipe conduits or hollow spaces in the housing, and can be injected there via a plurality of ports distributed around the circumference.

A first advantageous specific embodiment of the present invention provides that the discharge ports and the injection ports are situated in the compressor housing. The flow ducts can easily be routed here.

A second advantageous specific embodiment of the present invention provides that the discharge ports and the injection ports are situated in the hub area, in particular in a hub housing. As a rule, the feedback of the discharged air takes place here via pipe conduits.

A third advantageous specific embodiment of the present invention provides that the discharge ports are situated in the compressor housing and the injection ports are situated in the hub area, or the discharge ports are situated in the hub area and the injection ports are situated in the compressor housing. The transition from the compressor housing to the hub area can take place via conduits situated in guide vanes. It is also possible for air to blow out from vanes or structural components, in particular struts, situated upstream from the rear edges.

An advantageous development of the present invention provides that devices are provided for recognizing critical operating conditions. The device for recognizing critical operating conditions can be activated via an algorithm for recognizing these states, or by a pre-controlling in the case of maneuvers that can be recognized independently by the system or by an engine model that runs concomitantly in real time, such as engine accelerations or slams. In addition, corresponding sensors can also be used, which can be used as inputs for a corresponding regulating system.

An advantageous development of the present invention provides that the injection ports are fashioned as nozzles. Here, the nozzles are situated such that the air is injected into the annular space as close as possible to parallel to the flow. The geometry of the nozzles is designed such that the flow speed of the injected air stream is significantly greater than the speed of the flow in the critical cross-section.

An advantageous development of the present invention provides that the nozzles have a variable cross-section. This ensures the effectiveness of the injection in a wide operating range. The variable elements can be either regulated or set in a controlled manner via various actuating elements. Possible actuators include piezoelement, MEMS components, shape-memory alloys, or conventional electrical or hydraulic or pneumatic elements.

An advantageous development of the present invention provides that fast-opening valves are provided at the injection ports. This keeps the reaction time of the overall system low.

An advantageous development of the present invention provides that a valve controlling is provided for the continuous, modulated, or pulsed injection of air into the injection ports. Here, continuous means that injection takes place simultaneously from all injection points distributed around the circumference. In a modulated injection, the injection points distributed around the circumference are differently controlled in order for example to produce an injection stream that circulates in the annular space. In pulsed injection, each valve is opened and closed with a fixed frequency.

An advantageous development of the present invention provides that the discharge ports are situated in a high-pressure compressor or in a medium-pressure compressor, and the injection ports are situated in a fan or a low-pressure compressor. This ensures that sufficiently energized flow is always injected.

Further measures that improve the present invention are explained in more detail in the following, together with the description of a preferred exemplary embodiment of the present invention on the basis of the Figures.

Directional indications relate to the compressor axis, unless otherwise indicated. Identical or similar components have been provided with identical reference characters.

Figure 1:
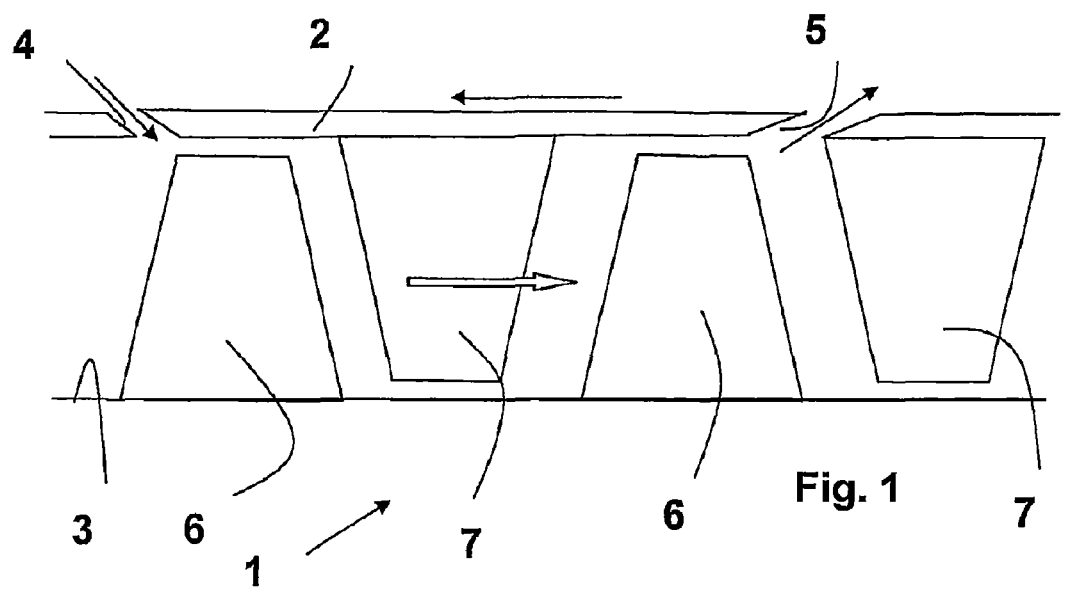
FIG. 1 shows a schematic representation of a first specific embodiment according to the present invention.

FIG. 1 shows a schematic representation of a first specific embodiment of a multistage compressor 1 having an axial construction for a gas turbine, having an essentially annular compressor housing 2, guide vanes 7 situated on the housing, impeller vanes 6 situated on a rotor, a hub area 3 that covers the rotor hub, discharge ports 5 distributed around the circumference, and injection ports 4, also distributed around the circumference, for stabilizing compressor 1 according to the present invention. The flow direction is indicated by a white arrow that runs from left to right in the plane of the drawing. Discharge ports 5 are situated at least one stage downstream from injection ports 4, which are provided with nozzles and fast-opening valves (not shown).

As soon as the recognition device (not shown) has recognized, via a corresponding algorithm or via a pre-controlling, a critical compressor operating state, i.e. a state of near-pumping or pumping, discharged air is provided to injection port 4 from the downstream discharge port via flow ducts (not shown) in compressor housing 2. The recirculation flow is indicated in the Figure by corresponding arrows. Through corresponding controlling of the fast-opening valves at the injection ports, air is injected into the compressor stage situated upstream with a sufficient pressure difference, via the nozzles situated in the injection ports. The controlling of the valves takes place via the recognition device. In the present exemplary embodiment, piezoelements are used as actuators, because they have particularly short response times. The injection of the energy-rich flow into the annular space of the endangered stage prevents separation of the flow and temporarily shifts the pump limit. As soon as the critical operating area has been moved through, the injection valves can be closed again in order to avoid unnecessarily reducing efficiency.

Figure 2:
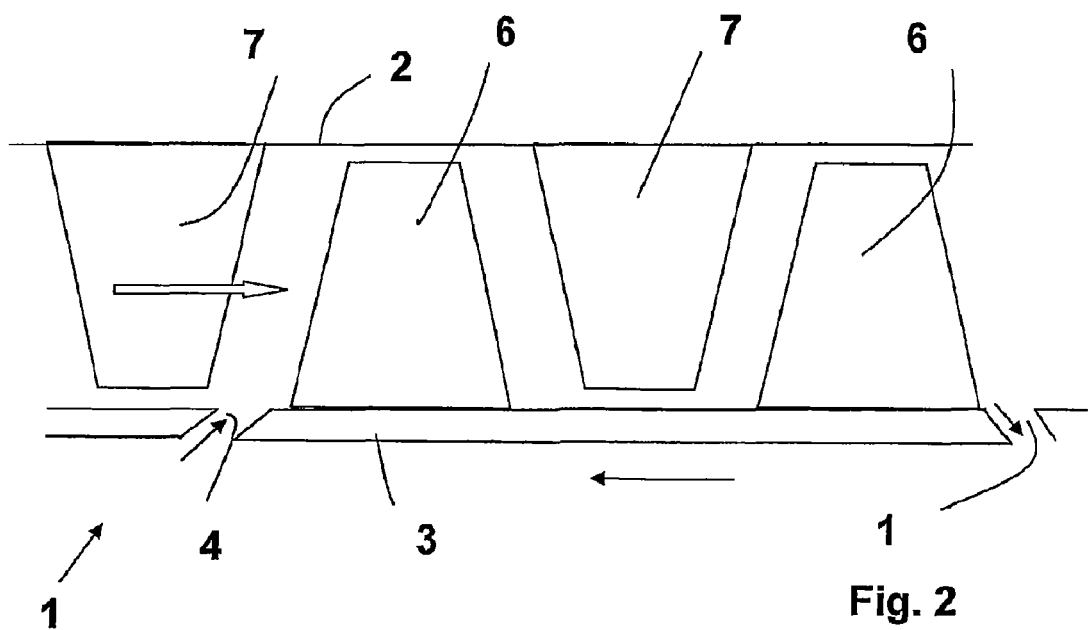
FIG. 2 shows a schematic representation of a second specific embodiment according to the present invention.
Figure 3:
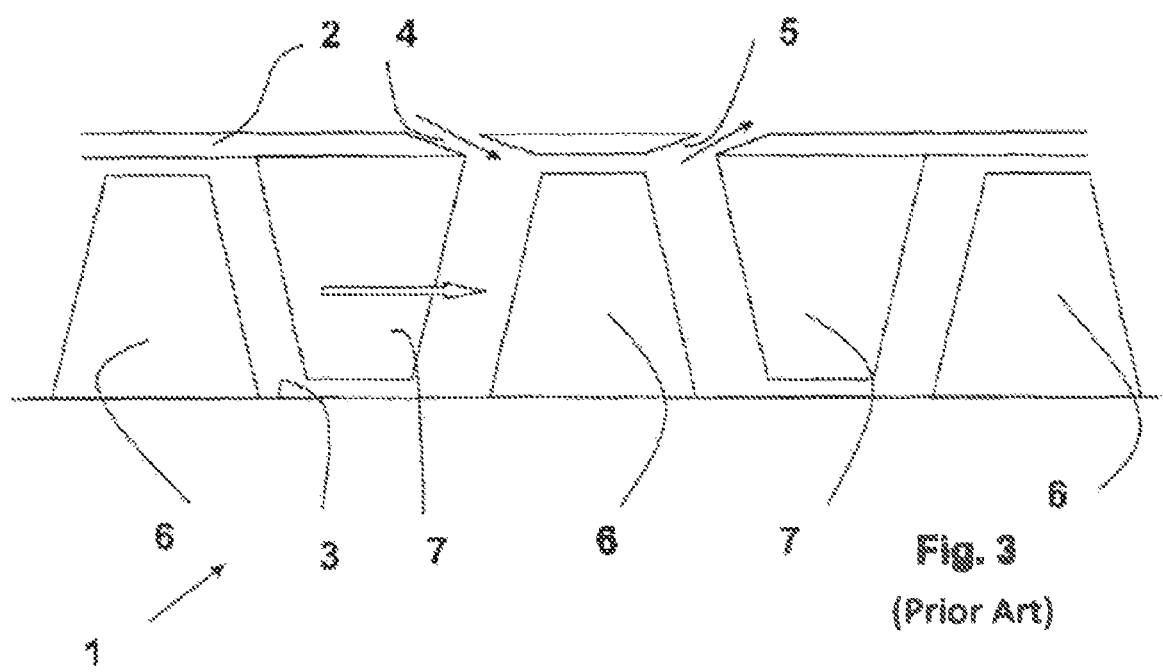
FIG. 3 shows a schematic representation of a known solution according to the prior art.

FIG. 2 shows a schematic representation of a second specific embodiment according to the present invention. In contrast to the first specific embodiment described above, here injection ports 4 and discharge ports 5 are situated in the hub area. The recirculation thus takes place in the wave area, via pipe conduits (not shown). The recirculation flow is also indicated by black arrows. Due to the action of centrifugal force at the injection opening, the injected air is given an additional speed component. Otherwise, the functioning and action are comparable to that described in connection with FIG. 1.

The realization of the present invention is not limited to the above-indicated preferred exemplary embodiment. Rather, a number of variants are conceivable that make use of the present solution in realizations having fundamentally different constructions.

The invention claimed is:

1. A multistage compressor for a gas turbine having a compressor housing defining an internal annular space, guide vanes, impeller vanes, and a hub area, for stabilizing the compressor flow, the compressor comprising:
   injection ports and discharge ports in the housing, the discharge ports are situated at least one stage downstream from the injection ports, the injection ports being fashioned as nozzles, and the geometry of these nozzles being designed such that the flow speed of an injected air stream from the injection ports is greater than a flow speed of air flowing in the internal annular space of the housing.

2. The multistage compressor for a gas turbine as recited in claim 1, wherein the discharge ports and the injection ports are situated in the hub area.

3. The multistage compressor for a gas turbine as recited in claim 1, wherein one of the discharge ports are situated in the compressor housing, and the injection ports are situated in the hub area, and the discharge ports are situated in the hub area and the injection ports are situated in the compressor housing.

4. The multistage compressor for a gas turbine as recited in claim 1, further comprising a recognition device for controlling the injection ports based on pre-determined operating conditions recognized by the recognition device.

5. The multistage compressor for a gas turbine as recited in claim 1, wherein the nozzles have a variable cross-section.

6. The multistage compressor for a gas turbine as recited in claim 1, wherein fast-opening valves are provided at the injection ports.

7. The multistage compressor for a gas turbine as recited in claim 1, further including a valve controlling provided for the continuous, modulated, or pulsed injection of air into the injection ports.

8. The multistage compressor for a gas turbine as recited in claim 1, wherein the discharge ports are situated in a high-pressure compressor or in a medium-pressure compressor, and the injection ports are situated in a fan or in a low-pressure compressor.

* * * * *